(12) United States Patent
Kataoka et al.

(10) Patent No.: US 8,714,400 B2
(45) Date of Patent: May 6, 2014

(54) PRESSURE VESSEL WITH IRREGULAR SHAPE

(75) Inventors: Yasuto Kataoka, Kobe (JP); Hiromitsu Hamaguchi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 13/571,897

(22) Filed: Aug. 10, 2012

(65) Prior Publication Data

US 2013/0048644 A1    Feb. 28, 2013

(30) Foreign Application Priority Data

Aug. 24, 2011    (JP) .................................. 2011-182507

(51) Int. Cl.
*F17C 1/00* (2006.01)
*F17C 1/14* (2006.01)
*F17C 13/00* (2006.01)

(52) U.S. Cl.
CPC .................. *F17C 1/14* (2013.01); *F17C 13/002* (2013.01); *F17C 2201/0123* (2013.01)
USPC ............................ 220/581; 220/608; 220/669

(58) Field of Classification Search
CPC .. F17C 1/14; F17C 13/002; F17C 2201/0123; F17C 2201/0109; F17C 2201/0104; F17C 2209/232; F17C 2209/23
USPC .................. 220/582, 581, 675, 669, 624, 623; 215/370, 382, 381, 379; 206/0.6
IPC .......................... F17C 1/00; B65D 8/04, 90/02
See application file for complete search history.

(56) References Cited

U.S. PATENT DOCUMENTS

| 3,313,599 | A | * | 4/1967 | Boon | ............................. 422/242 |
| 4,182,254 | A | * | 1/1980 | Secord | ........................ 114/74 A |
| 6,412,650 | B1 | * | 7/2002 | Warner | ........................ 220/4.12 |

FOREIGN PATENT DOCUMENTS

| JP | 11-082888 | 3/1999 |
| JP | 2003-106668 A | 4/2003 |
| JP | 2010-243015 | 10/2010 |

OTHER PUBLICATIONS

Lim, O-Kaung et al., "Optimization of Reinforcement of Thin-Walled Structures for a Natural Frequency", Journal of the Computational Structural Engineering Institute of Korea, Jun. 2006, pp. 195-202, vol. 19, Issue 2.

* cited by examiner

*Primary Examiner* — Robert J Hicks
(74) *Attorney, Agent, or Firm* — Morris, Manning & Martin, LLP; Juan Carlos A. Marquez

(57) ABSTRACT

A pressure vessel having reduced weight while satisfying required design conditions has polygonal upper and bottom walls, a side wall between the upper and bottom walls, an upper curved surface portion connecting the upper wall's peripheral edge and the side wall's upper end wall by curved surfaces convexed outward, and a lower curved surface portion connecting the bottom wall's peripheral edge and the side wall's lower end by curved surfaces convexed outward. The upper wall center portion is thicker than the upper curved surface portion, which is thicker than an upper wall annular portion formed between the upper wall center portion and the upper curved surface portion. The bottom wall center portion is thicker than the lower curved surface portion, which is thicker than a bottom wall annular portion formed between the bottom wall center portion and the lower curved surface portion.

7 Claims, 9 Drawing Sheets

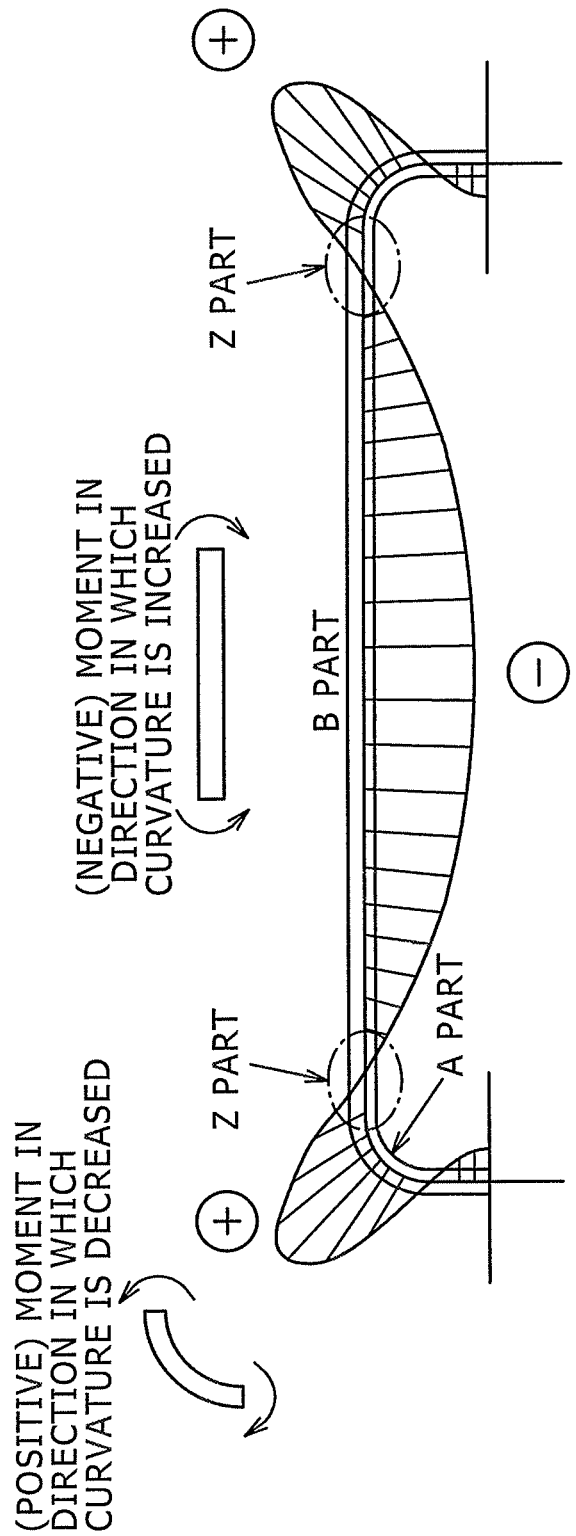

FIG. 7 — Prior Art
PLATE THICKNESS OF VESSEL: 17 mm
PLATE THICKNESS OF Y-DIRECTION RIB: 23 mm
PLATE THICKNESS OF X-DIRECTION RIB: 46 mm
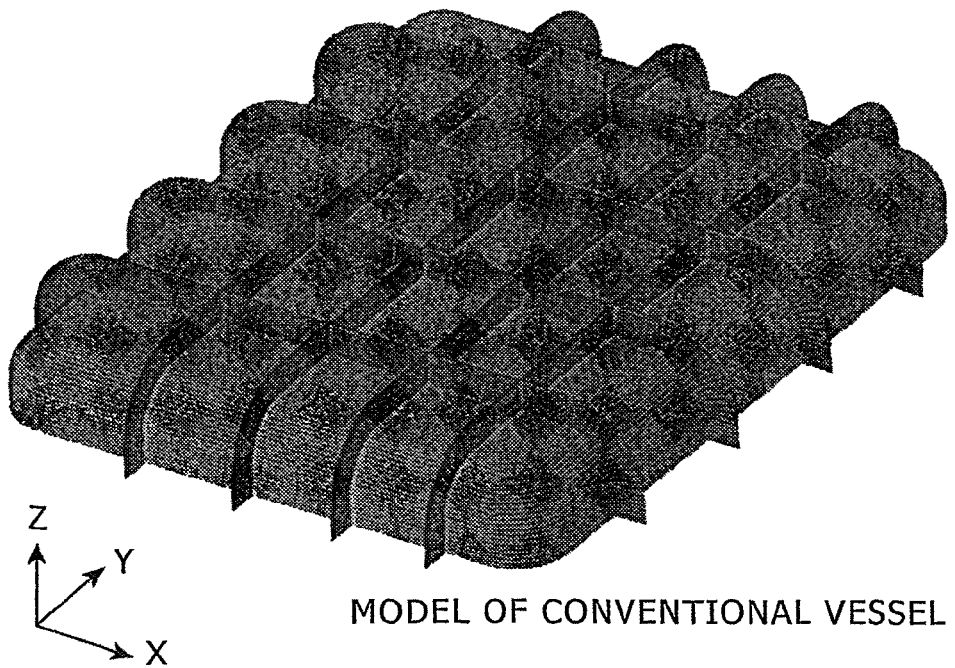
MODEL OF CONVENTIONAL VESSEL

FIG. 8

WEIGHT AND CHARACTERISTIC COMPARISON OF GAS COOLER

| No. | GAS COOLER MODEL | ENTIRE WEIGHT (kg) | WEIGHT RATIO TO CONVENTIONAL VESSEL | MAX. DISPLACEMENT AT 1.14 MPa (mm) | MAX. VON MISES STRESS AT 8.19 MPa (MPa) |
|---|---|---|---|---|---|
| COM. EX. | CONVENTIONAL VESSEL WITH CRISSCROSS REINFORCEMENT RIB | 254 | — | 1.36 | 425 |
| EX. 1 | MODEL OF OPTIMAL ANALYSIS ALLOWABLE STRESS OF 85 MPa | 287 | 1.13 | 0.56 | 355 |
| EX. 2 | MODEL OF OPTIMAL ANALYSIS ALLOWABLE STRESS OF 100 MPa | 254 | 1.00 | 0.68 | 359 |
| EX. 3 | MODEL OF OPTIMAL ANALYSIS ALLOWABLE STRESS OF 125 MPa | 222 | 0.87 | 0.97 | 380 |
| EX. 4 | MODEL OF OPTIMAL ANALYSIS ALLOWABLE STRESS OF 150 MPa | 198 | 0.78 | 1.18 | 401 |
| EX. 5 | MODEL OF OPTIMAL ANALYSIS ALLOWABLE STRESS OF 175 MPa | 180 | 0.71 | 1.47 | 419 |
| EX. 6 | MODEL OF OPTIMAL ANALYSIS ALLOWABLE STRESS OF 200 MPa | 168 | 0.66 | 1.69 | 429 |

PRESSURE VESSEL WITH IRREGULAR SHAPE

BACKGROUND OF THE INVENTION

1. Field of the Invention

The present invention relates to a pressure vessel used as a compressor gas cooler or the like.

2. Description of the Related Art

In general, the mechanically best shape for a pressure vessel is a spherical shape, and the second best shape is a cylindrical shape. However, for example in a case of a pressure vessel used as a compressor gas cooler, there is a need for considering connection to other major parts, members, and a piping system, a shape of a heat exchanger accommodated in the pressure vessel, further, an installment place of the pressure vessel itself, and the like. Therefore, in order to effectively utilize a space in the device, the shape is preferably a rectangular parallelepiped. For example, Japanese Unexamined Patent Application Publication No. 2003-106668 discloses a rectangular parallelepiped pressure vessel. It should be noted that the rectangular parallelepiped pressure vessel is not only limited to the compressor gas cooler but also frequently used in other machines and devices.

In addition, the pressure vessel requires design conditions of rigidity and strength. In the above rectangular parallelepiped pressure vessel described in Japanese Unexamined Patent Application Publication No. 2003-106668, grid shape ribs are provided in an outer periphery of the vessel in order to satisfy the required design conditions.

In general, as a pressure vessel, there is a need for reducing as much weight as possible while satisfying the required design conditions. However, in the pressure vessel described in Japanese Unexamined Patent Application Publication No. 2003-106668, the weight is increased for the ribs provided in the outer periphery of the vessel, and thus, it cannot be said that the weight can be reduced.

SUMMARY OF THE INVENTION

This invention is achieved in order to solve the problems as described above, and an object thereof is to provide a pressure vessel capable of reducing weight while satisfying required design conditions.

In order to solve the above problem, the present inventors focused on the fact that non-uniformity is generated in stress distribution generated by action of internal pressure of an accommodated high-pressure medium in walls of the pressure vessel. That is, the present inventors focused on the fact that the walls have parts where only relatively small stress is generated, and these parts are an excessively reinforced structure. Therefore, the present inventors found that instead of the structure in which the grid shape ribs directly connecting to a weight increase of the pressure vessel are provided, by cutting off the excessively reinforced parts in order to solve the generated non-uniformity of the stress distribution, materials can be decreased and the weight can be reduced.

The present invention is achieved from such a viewpoint to provide a pressure vessel, having a polygonal upper wall, a polygonal bottom wall provided on the lower side of the upper wall, a side wall provided between a peripheral edge of the upper wall and a peripheral edge of the bottom wall corresponding to the peripheral edge, an upper curved surface portion for connecting the peripheral edge of the upper wall and an upper end of the side wall by curved surfaces convexed outward, and a lower curved surface portion for connecting the peripheral edge of the bottom wall and a lower end of the side wall by curved surfaces convexed outward, wherein thickness becomes smaller in order of an upper wall center portion in center of the upper wall, the upper curved surface portion, and an upper wall annular portion formed between the upper wall center portion and the upper curved surface portion, and thickness becomes smaller in order of a bottom wall center portion in center of the bottom wall, the lower curved surface portion, and a bottom wall annular portion formed between the bottom wall center portion and the lower curved surface portion.

According to the pressure vessel of this invention, by increasing the thickness of the upper wall center portion and the bottom wall center portion where relatively large stress is generated and reducing the thickness of the upper wall annular portion and the bottom wall annular portion where only relatively small stress is generated, as the entire pressure vessel, while the required design conditions are satisfied, the materials can be decreased and the weight can be reduced. Generation of the non-uniformity of the stress distribution in the upper wall and the bottom wall of the pressure vessel can be suppressed.

In the present invention, preferably, the upper wall center portion and the upper wall annular portion are connected by a curved surface, the upper wall annular portion and the upper curved surface portion are connected by a curved surface, the bottom wall center portion and the bottom wall annular portion are connected by a curved surface, and the bottom wall annular portion and the lower curved surface portion are connected by a curved surface.

In such a way, the non-uniformity of the stress distribution generated in the upper wall and the bottom wall is easily solved, so that the weight of the pressure vessel can be more reduced.

In the present invention, preferably, an inner surface of the upper curved surface portion and an inner surface of the lower curved surface portion have the same curvature radius, the upper wall annular portion is positioned within a range of one half to twice more than the curvature radius from an inner surface of the side wall toward the upper wall center portion when the upper wall is seen from the upper side, and the bottom wall annular portion is positioned within a range of one half to twice more than the curvature radius from the inner surface of the side wall toward the bottom wall center portion when the bottom wall is seen from the lower side.

In such a way, while the non-uniformity of the stress distribution generated in the upper wall and the bottom wall is solved, the weight of the pressure vessel is easily reduced.

In the present invention, preferably, the upper wall annular portion is positioned in a part where a positive bending moment generated in the upper wall center portion at the time of action of internal pressure and a negative bending moment generated in the upper curved surface portion are balanced, and the bottom wall annular portion is positioned in a part where a positive bending moment generated in the bottom wall center portion at the time of action of internal pressure and a negative bending moment generated in the lower curved surface portion are balanced.

In such a way, the upper wall annular portion is positioned in the part where the positive bending moment and the negative bending moment are balanced in the upper wall, that is, in the part where extremely small stress is generated, and the bottom wall annular portion is positioned in the same part in the bottom wall. Thus, the thickness of the upper wall annular portion and the bottom wall annular portion can be more reduced, so that the weight of the pressure vessel can be further reduced.

In the present invention, preferably, the side wall has a shape in which thickness thereof is gradually increased from a main surface coupling portion for coupling main surfaces of the side wall toward main surface center portions in center of the main surfaces.

In such a way, while the non-uniformity of the stress distribution generated in the side wall is solved, thickness of the main surface coupling portion can be reduced. Thus, the weight of the pressure vessel can be further reduced.

In the present invention, preferably, the main surface of the side wall has a main surface thick portion having larger thickness than thickness of the main surface center portion between the main surface coupling portion and the main surface center portion.

In such a way, stress generated in the side wall can be applied onto the main surface thick portion, that is, the main surface thick portion can contribute to satisfaction of the design conditions required in the side wall part. Thus, thickness of the main surface can be entirely reduced, so that the weight of the pressure vessel can be reduced.

In the present invention, preferably, the upper wall and the bottom wall are square.

In such a way, an internal space of the pressure vessel is easily effectively ensured.

As described above, according to the present invention, the pressure vessel capable of decreasing the materials and reducing the weight while satisfying the required design conditions can be provided.

BRIEF DESCRIPTION OF THE DRAWINGS

FIG. 6 is a view for illustrating distribution of bending moments generated in a section by the line VI-VI of FIG. 5;

FIG. 7 is a perspective view of a half model of a conventional vessel in which grid shape ribs are provided;

FIG. 8 is a view showing analysis results of a comparative example and examples.

DESCRIPTION OF THE PREFERRED EMBODIMENTS

Figure 5:
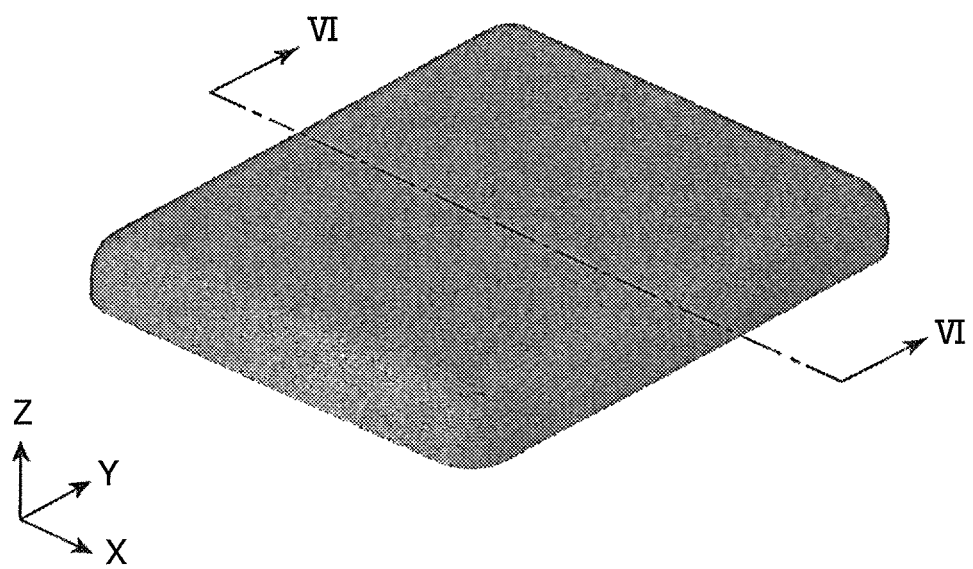
FIG. 5 is a perspective view of a half model of a rectangular parallelepiped pressure vessel.

In a case where internal pressure acts onto a rectangular parallelepiped pressure vessel, the vessel is basically deformed so as to be close to a spherical body. Firstly, this point will be described with reference to FIGS. 5 and 6. FIG. 5 is a perspective view of a half model of the rectangular parallelepiped pressure vessel. It should be noted that FIG. 5 shows an upper wall of the rectangular parallelepiped pressure vessel.

FIG. 6 schematically shows a distribution diagram of bending moments applied to a section by the line VI-VI of FIG. 5. In an A part in the figure, a bending moment in the direction in which a curvature is decreased, that is, a positive bending moment is applied. Meanwhile, in a B part, a bending moment in the direction in which the curvature is increased, that is, a negative bending moment is applied. At this time, in the vicinity of a Z part, positive and negative of the bending moment is reversed. Thus, the moment becomes zero or takes a very small value.

In the present embodiment, a shape of a pressure vessel substantially corresponds to a magnitude of the moments distributed as above. That is, basically, thickness of a part where an absolute value of the moment is large is increased, and thickness of a part where an absolute value is zero or small is reduced.

In such a way, since the thickness of the pressure vessel corresponds to the magnitude of the moments, a load is uniformly applied over the entire vessel. Thus, the pressure vessel can be formed in a wasteless shape. In other words, the conventional rectangular parallelepiped pressure vessel is formed in a shape that even a part where only a relatively small bending moment is generated has ribs having the same thickness as a part where a relatively large bending moment is generated. Thus, the part is excessively reinforced as extra thickness, and leads to an increase in weight.

Next, a preferred embodiment of the present invention will be described with reference to the drawings.

Figure 1:
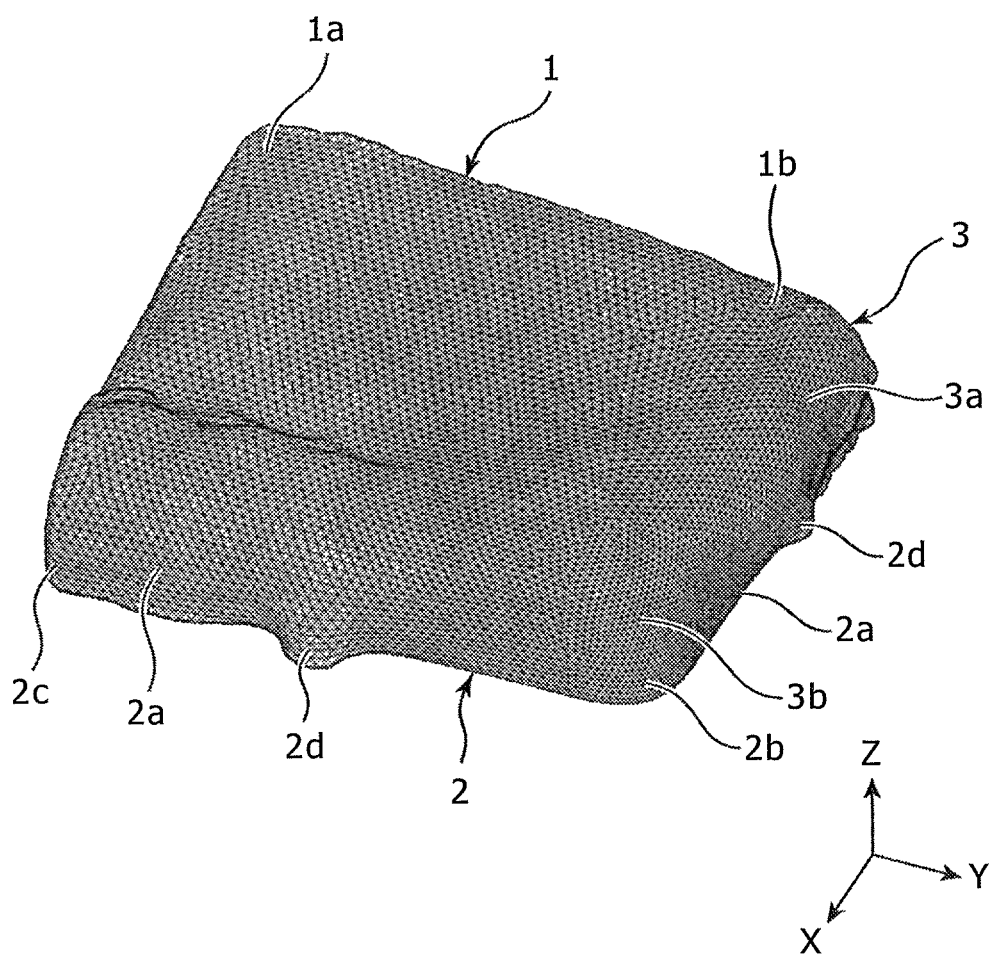
FIG. 1 is a perspective view of an eighth model of a pressure vessel according to one embodiment of the present invention.
Figure 2:
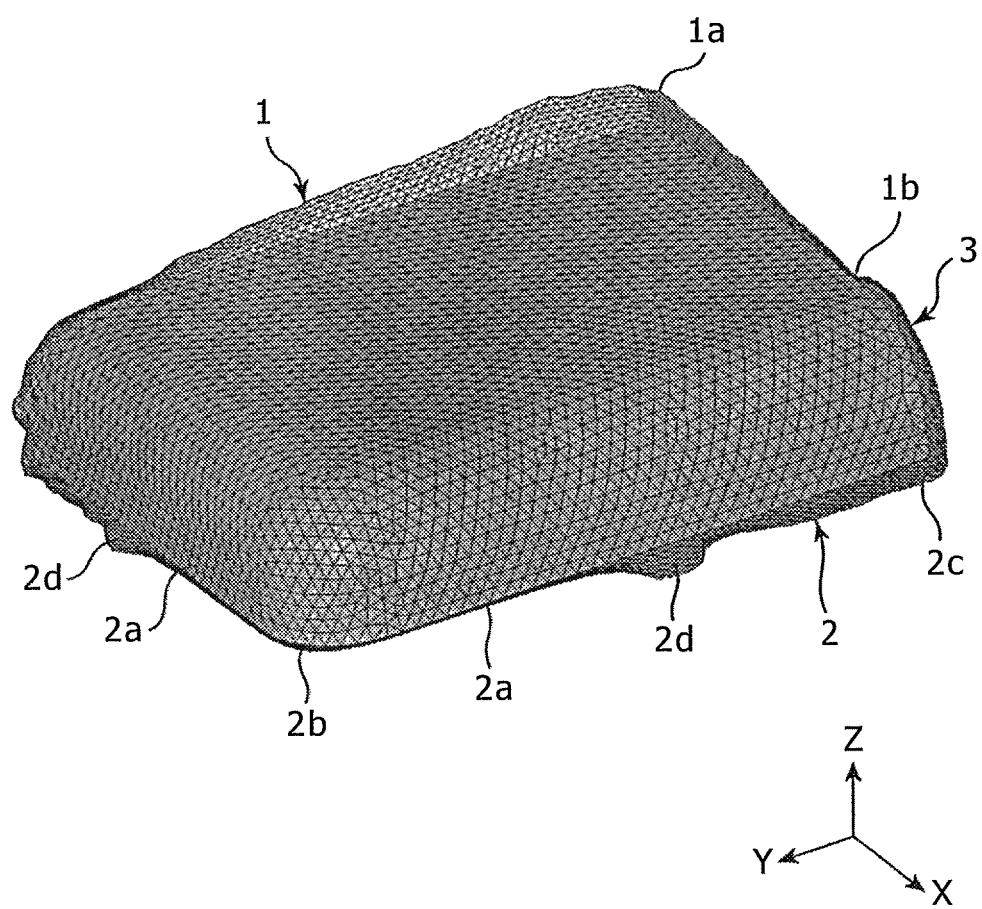
FIG. 2 is a perspective view of a state showing an inner surface of the model of FIG. 1.

FIG. 1 is a perspective view of an eighth model of a pressure vessel according to one embodiment of the present invention. That is, the pressure vessel of the present embodiment is formed in a symmetrical shape relative to centers of the X, Y, and Z directions. Thus, description will be given with using the eighth model in which the pressure vessel is respectively cut at the centers of the X, Y, Z directions. It should be noted that FIG. 1 shows part of an upper wall of the pressure vessel of the present embodiment. FIG. 2 is a perspective view of a state that the model shown in FIG. 1 is seen from the minus Z direction, that is, a state showing an inner surface of the upper wall.

As shown in FIGS. 1 and 2, the eighth model of the pressure vessel of the present embodiment has an upper wall 1, a side wall 2 provided between the upper wall 1 and a bottom wall (not shown), and an upper curved surface portion 3 for connecting a peripheral edge of the upper wall 1 and an upper end of the side wall 2 by curved surfaces convexed outward. Although this pressure vessel also has a heat exchanger, pipes, and the like inside thereof, these parts are not shown in the figures.

Figure 3:
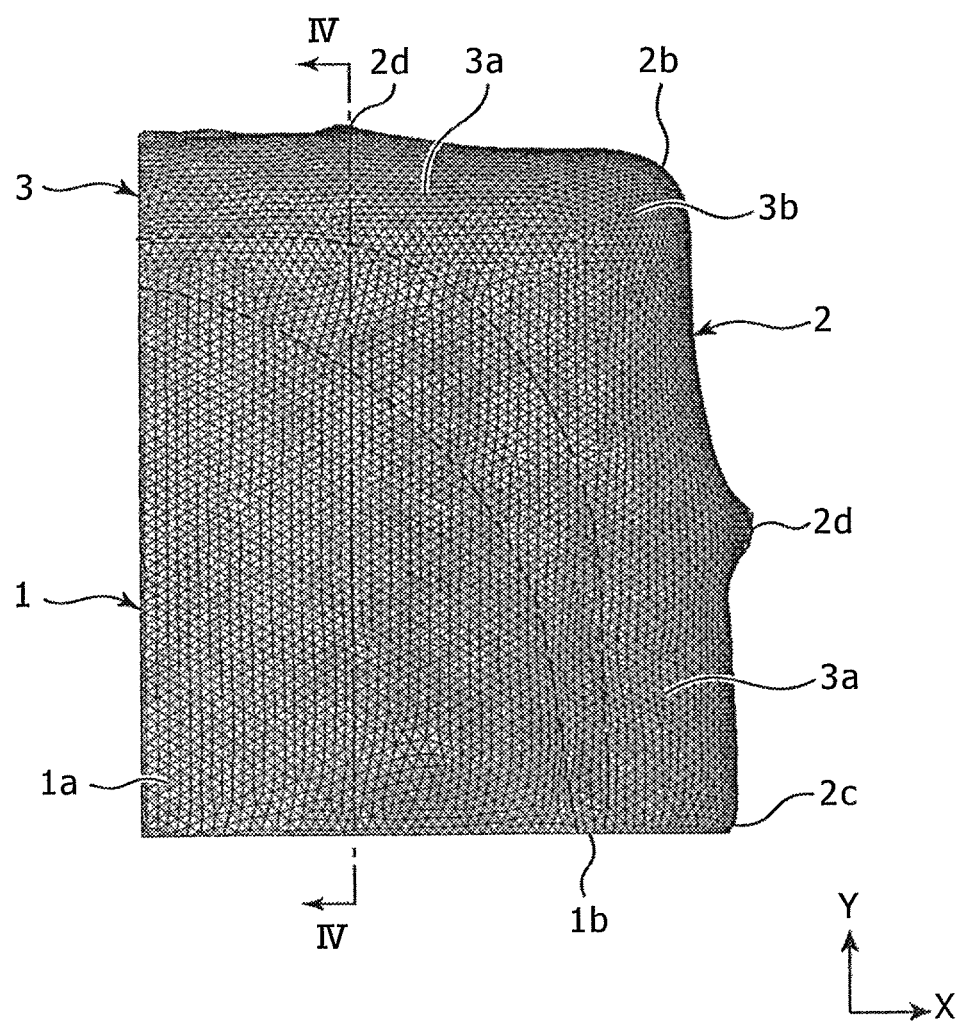
FIG. 3 is a plan view of the model of FIG. 1.
Figure 4:
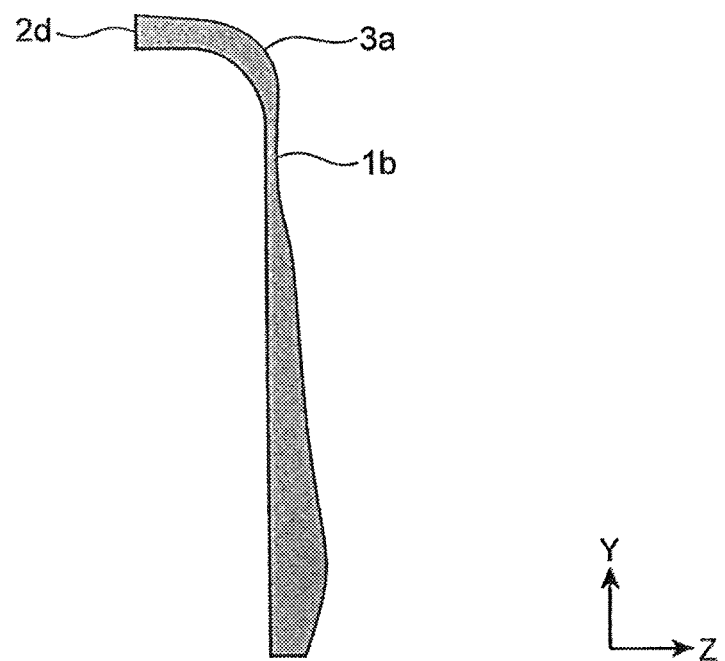
FIG. 4 is a sectional view of a section by the line IV-IV of FIG. 3.

The upper wall 1 has an upper wall center portion 1a in center thereof, and an upper wall annular portion 1b annularly formed in a circumference of this upper wall center portion 1a. As shown in FIG. 3, when the upper wall 1 is seen from the upper side, an outer edge of the upper wall annular portion 1b has a shape along a shape of a corner portion 3b in comparison to an inner edge in the vicinity of a coupling portion of adjacent sides of the upper wall 1, that is, in the vicinity of the corner portion 3b described later. That is, a gap between the inner edge and the outer edge of the upper wall annular portion 1b is wide in the vicinity of the corner portion 3b and narrow in the vicinity of center parts of the sides of the upper wall 1. As shown in FIGS. 1 and 2, the upper wall 1 has a shape in which the upper wall center portion 1a is the thickest, the upper wall annular portion 1b is the thinnest, thickness is gradually reduced from the upper wall center portion 1a to the upper wall annular portion 1b, and an outer surface thereof is connected by curved surfaces. As shown in FIG. 4, inclination in the X axis direction from the upper wall center portion 1a to the upper wall annular portion 1b on the outer surface of the upper wall 1 is larger than inclination in the Y axis direction. This is because the upper wall 1 of the present embodiment is rectangular elongated in the Y axis direction. Specifically, thickness of the upper wall center portion 1a is preferably 5 to 8 times more than thickness of the upper wall annular portion 1b. An outer circumference of the upper wall annular portion 1b is connected to the upper curved surface portion 3 described later. As shown in FIG. 2, an inner surface of the upper wall 1 is flatly formed.

In the upper wall center portion 1a, stress generated in the upper wall center portion 1a due to action of internal pressure of a high-pressure medium is the largest in the vessel. Thus, the upper wall center portion is formed so as to have the largest thickness in the upper wall 1. An outer surface of this upper wall center portion 1a may be flatly formed or formed in a curved surface convexed outward.

The upper wall annular portion 1b is formed so as to be positioned within a range of one half to twice more than a curvature radius r of an inner surface of the upper curved surface portion 3 described later from an inner surface of a main surface 2a of the side wall 2 toward the upper wall center portion 1a when the upper wall 1 is seen from the upper side. More preferably, the upper wall annular portion is formed in a part where a positive bending moment generated in the upper wall center portion 1a and a negative bending moment generated in the upper curved surface portion 3 are balanced, that is, in the part where the sum of the bending moments is zero or a very small value. An outer surface of this upper wall annular portion 1b is connected to an outer surface of the upper curved surface portion 3 by the curved surfaces.

The side wall 2 is provided between the peripheral edge of the upper wall 1 and a peripheral edge of the bottom wall. The side wall 2 has the main surfaces 2a serving as surfaces parallel to a XZ plane in FIG. 1 and the main surfaces 2a serving as surfaces parallel to an YZ plane, and main surface coupling portions 2b for coupling these main surfaces 2a. The main surface 2a has a main surface center portion 2c in center of the main surface 2a, and main surface thick portions 2d formed between the main surface coupling portions 2b and the main surface center portion 2c.

The main surface 2a has a shape in which thickness is gradually increased from an end on the side of the main surface coupling portion 2b to the main surface center portion 2c excluding a part of the main surface thick portion 2d, and an outer surface thereof is connected by a curved surface. That is, the main surface 2a has a shape in which the end on the side of the main surface coupling portion 2b is the thinnest, the thickness is gradually increased from the end on the side of the main surface coupling portion 2b to the main surface thick portion 2d formed to be the thickest in the main surface 2a, and the outer surface thereof is connected by the curved surface. The main surface has a shape in which the thickness is once the maximum in the part of the main surface thick portion 2d, the thickness is gradually increased from a part adjacent to the main surface thick portion to the main surface center portion 2c, and the outer surface thereof is connected by the curved surface. Specifically, thickness of the main surface center portion 2c is preferably 2 to 4 times more than thickness of the end on the side of the main surface coupling portion 2b. As shown in FIG. 2, the inner surface of the main surface 2a is flatly formed.

The main surface coupling portion 2b is a part for coupling the main surfaces 2a extending in the directions orthogonal to each other, and has a curved shape convexed outward. As shown in FIG. 2, this main surface coupling portion 2b has a curved inner surface for coupling flat inner surfaces of the main surfaces 2a.

In the main surface center portion 2c, stress generated in the main surface 2a at the time of the action of the internal pressure of the high-pressure medium is the largest in the main surface 2a. Thus, the thickness thereof is the second largest after the main surface thick portion 2d in the main surface 2a.

The main surface thick portion 2d is formed so as to have larger thickness than the thickness of the main surface center portion 2c. Specifically, the thickness of the main surface thick portion 2d is preferably 3 to 6 times more than the thickness of the end on the side of the main surface coupling portion 2b. This main surface thick portion 2d is provided in a substantially center part between the main surface coupling portion 2b and the main surface center portion 2c.

The upper curved surface portion 3 is a part for connecting the peripheral edge of the upper wall 1 and the upper end of the side wall 2 by the curved surfaces convexed outward, and has side portions 3a corresponding to the sides of the upper wall 1, and the corner portions 3b for coupling the adjacent side portions 3a. As shown in FIG. 2, the side portion 3a has a curved inner surface for connecting the flat inner surface of the upper wall 1 and the flat inner surface of the main surface 2a. The corner portion 3b has a curved inner surface for coupling the curved inner surfaces of the adjacent side portions 3a and connecting the inner surface of the upper wall 1 and the inner surface of the main surface coupling portion 2b. Thickness of this upper curved surface portion 3 is smaller than the thickness of the upper wall center portion 1a and larger than the thickness of the upper wall annular portion 1b. Specifically, the thickness of the upper curved surface portion 3 is preferably 2 to 4 times more than the thickness of the upper wall annular portion 1b. As shown in FIG. 2, the inner surface of the upper curved surface portion 3 is formed in an arc shape having the predetermined curvature radius r.

It should be noted that since a compressor gas cooler is manufactured by a casting method, even a vessel having changeable thickness as in the present embodiment can be manufactured.

As described above, in the pressure vessel of the present embodiment, the thickness of the upper wall center portion 1a and a bottom wall center portion where relatively large stress is generated is increased, and the thickness of the upper wall annular portion 1b and a bottom wall annular portion where only relatively small stress is generated is reduced. Thus, as the entire pressure vessel, while required design conditions are satisfied, materials can be decreased and weight can be reduced.

In the present embodiment, the upper wall center portion 1a and the upper wall annular portion 1b are connected by the curved surface, the upper wall annular portion 1b and the upper curved surface portion 3 are connected by the curved surface, the bottom wall center portion and the bottom wall annular portion are connected by a curved surface, and the bottom wall annular portion and a lower curved surface portion are connected by a curved surface. Thus, non-uniformity of stress distribution generated in the upper wall and the bottom wall is easily solved, so that the weight of the pressure vessel can be more reduced.

In the present embodiment, the inner surface of the upper curved surface portion 3 and an inner surface of the lower curved surface portion have the same curvature radius r, the upper wall annular portion 1b is positioned within a range of one half to twice more than the curvature radius r from an inner surface of the side wall 2 toward the upper wall center portion 1a when the upper wall 1 is seen from the upper side, and the bottom wall annular potion is positioned within a range of one half to twice more than the curvature radius r from the inner surface of the side wall 2 toward the bottom wall center portion when the bottom wall is seen from the lower side. Thus, while the non-uniformity of the stress distribution generated in the upper wall 1 and the bottom wall is solved, the weight of the pressure vessel is easily reduced.

In the present embodiment, the upper wall annular portion 1b is positioned in the part where the positive bending moment generated in the upper wall center portion 1a at the time of the action of the internal pressure and the negative bending moment generated in the upper curved surface portion 3 are balanced, and the bottom wall annular portion is positioned in a part where a positive bending moment generated in the bottom wall center portion at the time of the action of the internal pressure and a negative bending moment generated in the lower curved surface portion are balanced, that is, the upper wall annular portion 1b and the bottom wall annular portion are positioned in the parts where extremely small stress is generated. Thus, the thickness of the upper wall annular portion 1b and the bottom wall annular portion can be more reduced, so that the weight of the pressure vessel can be further reduced.

In the present embodiment, the side wall 2 has a shape in which the thickness thereof is gradually increased from the main surface coupling portion 2b toward the main surface center portion 2c. Thus, while the non-uniformity of the stress distribution generated in the side wall 2 is solved, the thickness of the main surface coupling portion 2b can be reduced, so that the weight of the pressure vessel can be further reduced.

In the present embodiment, the main surface 2a of the side wall 2 has the main surface thick portion 2d having larger thickness than the thickness of the main surface center portion 2c between the main surface coupling portion 2b and the main surface center portion 2c. Thus, stress generated in the side wall 2 can be applied onto the main surface thick portion 2d, that is, the main surface thick portion 2d can contribute to satisfaction of the design conditions required in the side wall 2 part. Therefore, the thickness of the main surface 2a can be entirely reduced, so that the weight of the pressure vessel can be reduced.

In the present embodiment, the upper wall and the bottom wall are square. Thus, an internal space of the pressure vessel is easily ensured.

The pressure vessel of the present embodiment does not have ribs unlike the conventional rectangular parallelepiped pressure vessel. Thus, the weight can be reduced to a larger extent than the conventional pressure vessel. Further, thickness of the vessel itself is changed in accordance with the stress distribution generated in the walls of the pressure vessel. Thus, generation of the non-uniformity of the stress distribution in the walls of the vessel can be suppressed, and the load can be efficiently applied over the entire pressure vessel.

It should be noted that the embodiment disclosed herein is not a limitation but an example in all respects. The range of the present invention is indicated not by the description of the above embodiment but by the claims, and further includes all equivalent meanings to the claims and all changes within the scope of the claims.

For example, the above embodiment shows the example that the upper wall 1 and the bottom wall are square. However, these parts are not limited to square but may have other polygonal shapes. It should be noted that even in a case of other polygonal shapes, the same operations and effects to a case of square can be obtained.

The above embodiment shows the example that the side wall 2 has the main surface thick portion 2d. However, this main surface thick portion 2d may be omitted, and the main surface 2a may have a shape in which the thickness is gradually increased from the end on the side of the main surface coupling portion 2b to the main surface center portion 2c. It should be noted that in this case, the required design conditions cannot be satisfied only by simply omitting the main surface thick portion 2d. Thus, there is a need for omitting the main surface thick portion 2d and also increasing the thickness of the main surface 2a so that the stress is applied over the entire main surface 2a. Therefore, in comparison to a case where the side wall has the main surface thick portion 2d, a ratio of reduction in the weight is decreased.

The above embodiment shows the example that the upper wall center portion 1a and the upper wall annular portion 1b are connected by the curved surface, the upper wall annular portion 1b and the upper curved surface portion 3 are connected by the curved surface, the bottom wall center portion and the bottom wall annular portion are connected by curved surface, and the bottom wall annular portion and the lower curved surface portion are connected by curved surface. However, all these points may be connected by flat surfaces.

Next, examples of the pressure vessel of the present embodiment will be described in comparison to the conventional rectangular parallelepiped pressure vessel shown in FIG. 7.

EXAMPLES

FEM analysis models of the conventional rectangular parallelepiped pressure vessel shown in FIG. 7 and various shapes of the pressure vessel of the present embodiment shown in FIG. 1 were made, and stress and displacement at the time of the action of the internal pressure were compared by elasto-plastic analysis. Weight was also compared. It should be noted that size and materials of the models of examples 1 to 6 are the same. Major design conditions of rigidity and strength of the pressure vessel of the present embodiment, that is, the pressure vessel used as the compressor gas cooler are the following two points.
(1) A maximum displacement amount with maximum use pressure of 1.14 MPa (hereinafter, referred to as the "condition 1 value") is 2.5 mm or less.
(2) Maximum stress with minimum pressure fracture strength of 8.19 MPa (hereinafter referred to as the "condition 2 value") is 430 MPa or less.

It should be noted that although the present embodiment will be described hereinafter based on the examples, the present embodiment is not limited to the following examples as long as the embodiment does not exceed the gist thereof.

Comparative Example

FIG. 7 is the analysis model of the conventional rectangular parallelepiped pressure vessel having grid shape reinforcement ribs. This model is a shell element model and serves as an upper half model based on symmetry. Regarding size of this model, values of thickness center are 772.5 mm long, 631 mm wide, and 180 mm high, and plate thickness is 17 mm. Height of the ribs is 26.5 mm (26.5+17/2=35 mm on the shell model), thickness of the Y-direction ribs is 23 mm, and thickness of the X-direction ribs is 46 mm.

In this comparative example, weight of the entire vessel is 254 kg, the condition 1 value is 1.36 mm, and the condition 2 value is 425 MPa.

Example 1

Next, the example 1 of the pressure vessel of the present embodiment shown in FIG. 1 will be described. Inner surface size of this model is 755.5 mm long, 614 mm wide, and 163 mm high. FCD450 is used as a material. In the example 1, a shape of the pressure vessel in which allowable stress at the time of action of the maximum use pressure of 1.14 MPa is 85 MPa was analyzed. In this example 1, weight of the entire vessel is 287 kg, the condition 1 value is 0.56 mm, and the condition 2 value is 355 MPa.

Example 2

In the example 2, a shape of the pressure vessel in which the allowable stress at the time of the action of the maximum use pressure of 1.14 MPa is 100 MPa was analyzed. In this example 2, the weight of the entire vessel is 254 kg, the condition 1 value is 0.68 mm, and the condition 2 value is 359 MPa.

Example 3

In the example 3, a shape of the pressure vessel in which the allowable stress at the time of the action of the maximum use pressure of 1.14 MPa is 125 MPa was analyzed. In this example 3, the weight of the entire vessel is 222 kg, the condition 1 value is 0.97 mm, and the condition 2 value is 380 MPa.

Example 4

In the example 4, a shape of the pressure vessel in which the allowable stress at the time of the action of the maximum use pressure of 1.14 MPa is 150 MPa was analyzed. In this example 4, the weight of the entire vessel is 198 kg, the condition 1 value is 1.18 mm, and the condition 2 value is 401 MPa.

Example 5

In the example 5, a shape of the pressure vessel in which the allowable stress at the time of the action of the maximum use pressure of 1.14 MPa is 175 MPa was analyzed. In this example 5, the weight of the entire vessel is 180 kg, the condition 1 value is 1.47 mm, and the condition 2 value is 419 MPa.

Example 6

In the example 6, a shape of the pressure vessel in which the allowable stress at the time of the action of the maximum use pressure of 1.14 MPa is 200 MPa was analyzed. In this example 6, the weight of the entire vessel is 168 kg, the condition 1 value is 1.69 mm, and the condition 2 value is 429 MPa.

Figure 9:
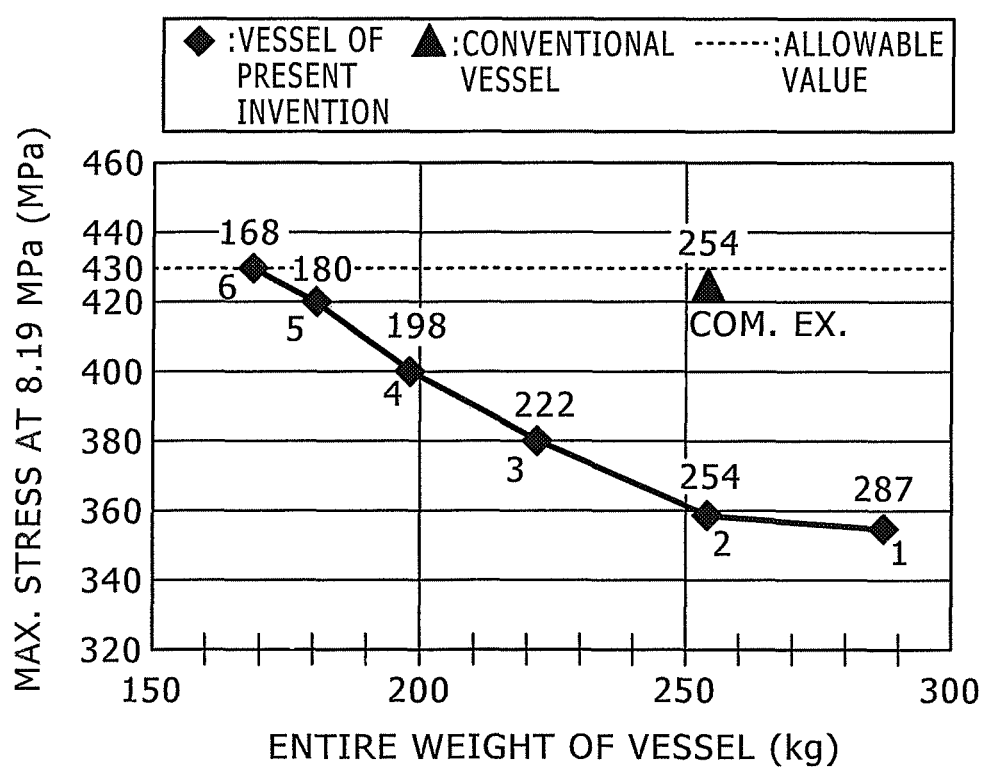
FIG. 9 is a graph showing the results of FIG. 8.

The above results are shown in a table of FIG. 8 and in a graph of FIG. 9.

As clear from FIGS. 8 and 9, the pressure vessels of the example 2 to the example 6 can satisfy the design conditions and reduce the weight more than the conventional pressure vessel. In particular, with the pressure vessel of the example 6, while a substantially similar strength characteristic to the conventional pressure vessel is ensured, the weight can be about 66% of the conventional pressure vessel. It should be noted that when the allowable stress at the time of optimized analysis takes a value between the examples, a shape, thickness distribution, and the like of the pressure vessel are similar to a shape and thickness distribution of FIGS. 1 and 2.

In the pressure vessels of the examples 1 to 6, stress is substantially uniform on both front and back surfaces over the substantially entire vessel excluding the corner portions, and as a result, the load is applied onto the vessel as a whole without any waste. Meanwhile, in a case of the conventional vessel shown in FIG. 7, the parts with relatively low stress are generated in a wide range in comparison to the examples of the present embodiment, and as a result, the load cannot be efficiently applied onto the entire vessel.

What is claimed is:
1. A pressure vessel, having:
a polygonal upper wall;
a polygonal bottom wall provided on the lower side of said upper wall;
a side wall provided between a peripheral edge of said upper wall and a peripheral edge of said bottom wall;
an upper curved surface portion for connecting the peripheral edge of said upper wall and an upper end of said side wall by curved surfaces convexed outward; and
a lower curved surface portion for connecting the peripheral edge of said bottom wall and a lower end of said side wall by curved surfaces convexed outward, wherein in order of decreasing thickness are an upper wall center portion in center of said upper wall, said upper curved surface portion, and an upper wall annular portion formed between said upper wall center portion and said upper curved surface portion, and
in order of decreasing thickness are a bottom wall center portion in center of said bottom wall, said lower curved surface portion, and a bottom wall annular portion formed between said bottom wall center portion and said lower curved surface portion.
2. The pressure vessel according to claim 1, wherein
said upper wall center portion and said upper wall annular portion are connected by a curved surface,
said upper wall annular portion and said upper curved surface portion are connected by a curved surface,
said bottom wall center portion and said bottom wall annular portion are connected by a curved surface, and
said bottom wall annular portion and said lower curved surface portion are connected by a curved surface.
3. The pressure vessel according to claim 1, wherein
an inner surface of said upper curved surface portion and an inner surface of said lower curved surface portion have the same curvature radius,
said upper wall annular portion is positioned within a range of one half to twice more than the curvature radius from an inner surface of said side wall toward said upper wall center portion when said upper wall is seen from the upper side, and
said bottom wall annular portion is positioned within a range of one half to twice more than the curvature radius from the inner surface of said side wall toward said bottom wall center portion when said bottom wall is seen from the lower side.
4. The pressure vessel according to claim 1, wherein
said upper wall annular portion is positioned in a part where a positive bending moment generated in said upper wall center portion at the time of action of internal pressure and a negative bending moment generated in said upper curved surface portion are balanced, and
said bottom wall annular portion is positioned in a part where a positive bending moment generated in said bottom wall center portion at the time of action of internal pressure and a negative bending moment generated in said lower curved surface portion are balanced.
5. The pressure vessel according to claim 1, wherein
said side wall has a shape in which thickness thereof is gradually increased from a main surface coupling por- tion for coupling main surfaces of said side wall toward main surface center portions in center of said main surfaces.

6. The pressure vessel according to claim 5, wherein said main surface of said side wall has a main surface thick portion having larger thickness than thickness of said main surface center portion between said main surface coupling portion and said main surface center portion.

7. The pressure vessel according to claim 1, wherein said upper wall and said bottom wall are square.

* * * * *